United States Patent [19]

Bjerk et al.

[11] 4,045,402

[45] Aug. 30, 1977

[54] FLUOROELASTOMER-POLYACRYLATE BASED FRICTION MATERIAL

[75] Inventors: Roger O. Bjerk, Edelstein; William D. Brandon; Frederick S. Engelking, both of Peoria; John P. Jero, Washington, all of Ill.

[73] Assignee: Caterpillar Tractor Co., Peoria, Ill.

[21] Appl. No.: 601,398

[22] Filed: Aug. 1, 1975

Related U.S. Application Data

[63] Continuation-in-part of Ser. No. 366,967, June 4, 1973, Pat. No. 3,898,361.

[51] Int. Cl.² .......................... C08K 3/04; C08K 7/14
[52] U.S. Cl. .............................. 260/42.18; 260/42.27; 260/900; 260/998.13; 428/325; 428/421; 428/463
[58] Field of Search ............... 260/42.18, 42.27, 900

[56] References Cited

U.S. PATENT DOCUMENTS

| 3,634,309 | 1/1972 | Palumbo | 260/42.27 |
| 3,898,361 | 8/1975 | Bjerk | 260/42.27 |

FOREIGN PATENT DOCUMENTS

| 1,163,950 | 9/1969 | United Kingdom |

OTHER PUBLICATIONS

E. I. Du Pont de Nemours & Co., Wilmington, Del., July 1960, "Blends of Viton and Polyacrylic Rubber."

*Primary Examiner*—James H. Derrington
*Attorney, Agent, or Firm*—Phillips, Moore, Weissenberger, Lempio & Majestic

[57] ABSTRACT

High modulus asperities are incorporated into a fluoroelastomer-polyacrylate elastomer matrix to provide a material which, when cured, exhibits high, stable coefficients of friction over a wide temperature range.

5 Claims, 2 Drawing Figures

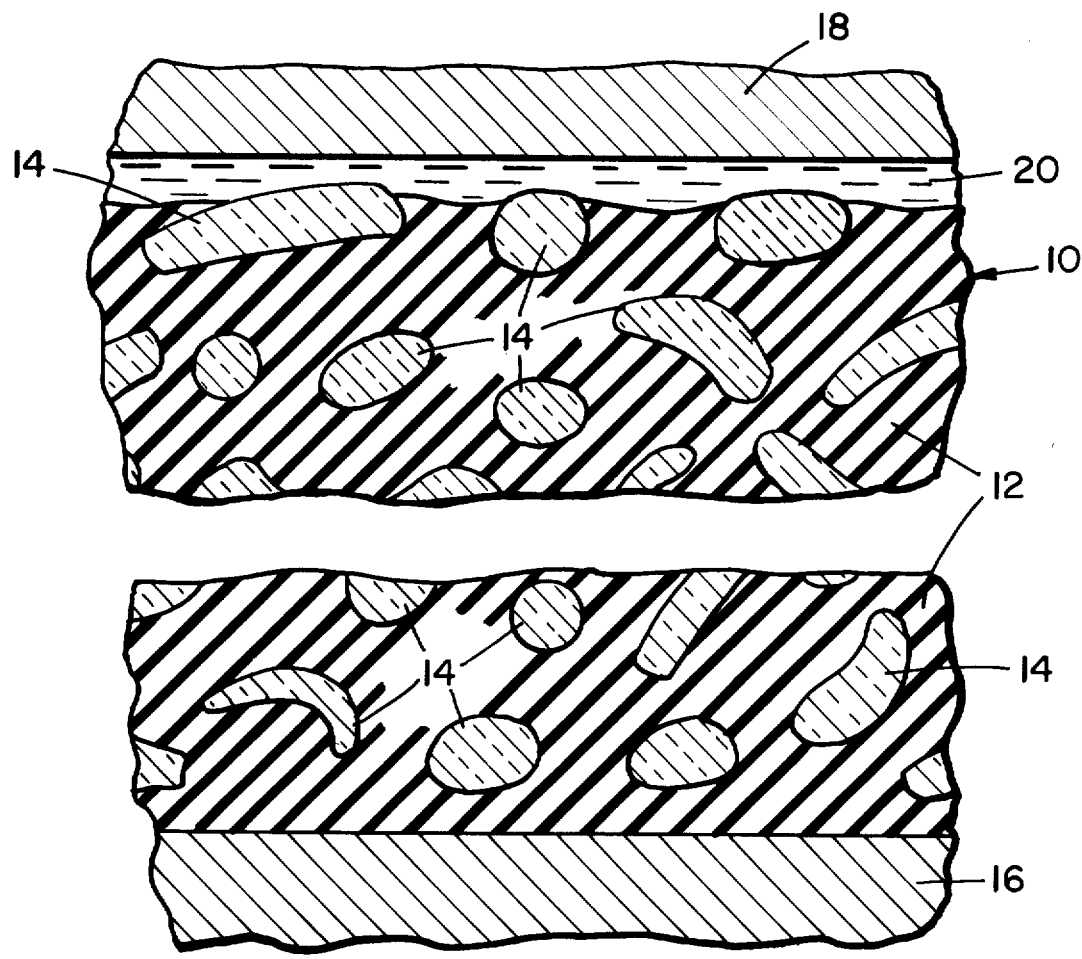
FIG_1
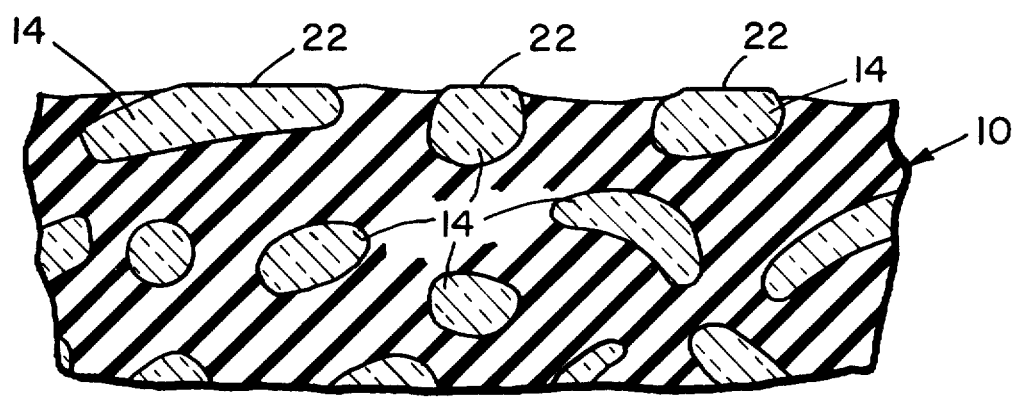
FIG_2

FLUOROELASTOMER-POLYACRYLATE BASED FRICTION MATERIAL

CROSS-REFERENCE

This application is a continuation-in-part of copending application Ser. No. 366,967 filed June 4, 1973, now U.S. Pat. No. 3,898,361.

BACKGROUND OF THE INVENTION

This invention relates to composite materials. More specifically, this invention relates to composite friction materials which exhibit high, stable, coefficients of friction over a wide temperature range.

The elastomeric materials heretofore proposed for use as friction materials have generally proven to be unsatisfactory when exposed to high ambient working temperatures such as encountered, for example, in clutch and brake applications in heavy duty service vehicles. Typically, such materials have been based on heat-hardenable resins such as phenol-aldehyde resins which tend to heat-decompose under the high peak and bulk temperature conditions created by the sustained and/or heavy loading forces experienced in the clutch and brake systems of these vehicles while operating. As a result of this decomposition, the physical properties of these materials typically deteriorate, and the consequent softening of the material and dispersal of the products of heat decomposition generally interfere with the functioning of the friction unit. Furthermore, many times after friction material comprising a partially heat-decomposed heat-hardenable resin has cooled, the material will exhibit a less stable coefficient of friction than did the original material.

These conditions, as well as other problems associated with these and similar friction materials, result in a loss of efficiency in the friction unit and unreliability in the service vehicle, which is highly undesirable.

Many attempts have been made to obviate the problems associated with the polymers in general use as friction material basis. Many different resins have been experimented with, in attempts to obtain a friction material which possesses a high, stable coefficient of friction over a wide temperature range. Modification of the heat-hardenable resins with other polymeric materials has been attempted. Many of these friction material formulations have not performed well. Other formulations have required multi-step procedures which are costly in terms of labor and frequently in terms of the material used in these formulations.

Importantly, also, many of these known friction materials require a bonding agent to affix them to the backing plate or "core" portion of the friction element. This requirement severely restricts the scope of the molding methods and mold configurations employable in forming these friction elements. In injection molding, for example, the bonding agent is subject to scuffing during the molding process, which deactivates or destroys the bond and renders this molding process useless with these friction elements. In general, where bonding agents must be utilized, only compression molding and relatively simple mold configurations can be employed in the process of molding the friction element.

In order to obtain a friction material with a usefully high coefficient of friction which is stable over a wide temperature range, the industry has most usually used nonresilient inorganic friction materials such as sintered bronze. Although the friction characteristics of this and similar metallic materials have been generally satisfactory under high temperature conditions, the high modulus or lack of resiliency of these materials and their resultant inability during operation to conform to the friction element mating surface and absorb adequate energy result in relatively high wear rates and shortened life. Furthermore, great care must be taken in the type of oil used in conjunction with such friction materials during use to ensure that the desired coefficient of friction is not impaired.

It is therefore an object of this invention to provide a friction material composition with a high, stable coefficient of friction over a wide range of dynamic operating conditions.

It is a further object of this invention to provide a friction material composition with high dynamic and static coefficients of friction over a wide temperature range.

It is a further object of this invention to provide a friction material composition which can readily be bonded to a metal core material.

It is an additional object of this invention to provide a friction material composition which can be compression molded, and which can be molded in conjunction with complex mold configurations.

It is also an object of this invention to provide a conformable, long-wearing friction material composition with a high, stable coefficient of friction over a wide temperature range.

Other objects and purposes of this invention will be apparent to those skilled in the art from the disclosure contained herein.

BRIEF SUMMARY OF THE INVENTION

Broadly, the composite friction material of this invention comprises a fluoroelastomer-polyacrylate matrix compounded with minute particles of a friction-producing agent, or "high modulus asperities." The fluoroelastomer-polyacrylate matrix has excellent properties of thermal stability, and at the same time provides a relatively low modulus resilient matrix which permits the friction material to conform readily to inherently rapid changes between it and its mating surface, thereby distributing dynamic stresses and energy absorption over a much larger true friction surface area than is permitted with high modulus metallic or other non-resilient materials.

Maximum energy absorption rates of from about 3 to about 5 HP/in$^2$ of fluoroelastomer friction material are typical. In comparison with these high modulus materials, such a low modulus matrix significantly increases the load-carrying capabilities of the friction element of which it is a part, and further, possesses superior wear characteristics when compounded with high modulus asperities as herein disclosed.

The high modulus asperities, generally glassy or related substances, are compounded with the matrix (intermixed with and dispersed throughout the matrix in mechanically held nonbonded relation to said matrix) in sufficient quantities to produce a relatively high concentration of these asperities on the frictional surface of the matrix. In addition to acting as the friction-producing agent in the friction material, these asperities further serve to strengthen the support matrix and lessen compression set or permanent deformation under applied loads.

The compounded friction material is then applied to the core of the friction element, for example as disclosed in copending application Ser. No. 408,166, by William D. Brandon, filed Oct. 19, 1973, now U.S. Pat. No. 3,940,527, as a continuation of application Ser. No. 307,420 by William D. Brandon filed Nov. 17, 1972, now abandoned both of common assignment herewith.

DESCRIPTION OF THE DRAWING

FIG. 1 illustrates in greatly enlarged view a section through the improved friction material disposed adjacent a substantially flat reaction plate with a relatively thin energy absorbing oil film therebetween and with a metal backing plate bonded thereto.

FIG. 2 illustrates in greatly enlarged view the surface of the improved friction material after this surface has been "worn in." The asperities are noted to have flattened upper surfaces produced upon "wearing in" of the material.

DETAILED DESCRIPTION OF THE INVENTION

This invention provides a fluoroelastomer-polyacrylate based material having vitreous particles dispersed therethrough. This composite material exhibits tensile strengths comparable with the fluoroelastomer-polyacrylate matrix material alone, but however exhibits better set and stress relaxation resistance than the matrix alone.

The fluoroelastomers useful in this invention as part of the matrix material are exemplified by Viton E60C, (E. I. Dupont Inc., Wilmington, Del.), a copolymer of hexafluoropropylene and vinylidene fluoride, and a similar copolymer Fluorel FC2170 (The 3M Company, of Minneapolis, Minn.). Preferably, Viton E60C or Fluorel FC2170 are employed to form the matrix of the friction material.

The polyacrylates useful in this invention as part of the matrix material are thermosetting elastomers of acrylic acid and its esters having a repeating structural formula $—CH_2— CH (COOR) —$ where R is hydrogen or a low molecular weight alkyl group having one to six carbon atoms, e.g., methyl, ethyl, or one of the propyl, butyl, pentyl, or hexyl isomers. Generally, the ethyl, propyl and butyl esters are preferred. Mixed polyacrylates, i.e., those where some of the R groups are different than others, e.g., some are ethyl and some are butyl are quite usable. Polyacrylates wherein R is ethyl and also wherein some R is ethyl and some R is butyl have very desirable properties. The monomers generally polymerize easily in the presence of heat, light or catalysts, e.g., benzoyl peroxide or the like. The inclusion of acrylic anhydride, glycol esters or acrylic or methacrylic acid or acrylamide is advantageous in assuring that the resulting resin is insoluble and thermosetting. The presence of some acrylonitrile may also be desirable to adjust resiliency.

To form the composite material of the invention, the matrix is compounded with particles of a relatively hard material, herein referred to as "asperities." These asperities are preferably glassy materials or ceramic materials in very small beads, fibers or other irregular shapes.

Although the useful size of these asperities may vary somewhat according to the nature of the material and other factors, glass fiber particles of from about 0.0001 inch to about 0.005 inch in diameter, and preferably about 0.0005 inch in diameter, will yield the desired results. Such particles advantageously have a length to diameter ratio of from about 3 to about 10,000. They have melting points in the very general neighborhood of 1400° F. Other useful asperities include ceramics such as commercially available Fiberfrax which have melting points very generally in the neighborhood of 3200° F. The glass fiber or other asperities may also be compounded in the form of chips, fibers, spheres or other convenient shapes, although fibers are generally preferable.

The asperities are compounded with the fluoroelastomer-polyacrylate matrix at a rate sufficient to give and maintain a high surface concentration of asperities in the finished friction facing. Preferably, about 20 to about 60% by weight of fiberglass particles to about 20 to about 60% by weight of matrix are admixed to provide a randomly irregular macroscopic surface finish on the friction material. It may in some instances, however, be desirable to exceed these proportions, depending on the frictional characteristics desired in the finished material.

Generally, the matrix will include fluoroelastomer and polyacrylate in weight ratio from about 1:11 to about 11:1. The preferred weight ratio will fall within the range from about 1:5 to about 5:1. Further, such matrix will generally include at least about 5 weight percent (of the 20–60 weight percent total matrix) of fluoroelastomer. Thus, matrices having from about 5 weight percent fluoroelastomer and about 55 weight percent polyacrylate to matrices having from about 55 weight percent fluoroelastomer to about 5 weight percent polyacrylate are contemplated as falling within the scope of the invention.

It is contemplated that carbon black will be incorporated into the compound matrix, conveniently at the same time the asperities and the fluoroelastomer and polyacrylate portions of the matrix are incorporated. This additive is preferably added in amounts of about 12 to about 40% by weight of carbon black to about 20 to about 60% by weight of matrix. Additionally, accelerators, stabilizers, and curing agents, inter alia, commonly used in fluoroelastomer and/or polyacrylate products, will usually by compounded with the matrix.

The asperities, carbon black, and other additives are incorporated into the matrix by conventional mixing techniques, for example, in a Banbury mixer. Ideally, the asperities should be concentrated near the surface, or the frictionally active portion, of the matrix. However, in practicality this is difficult to achieve, and satisfactory results are obtained by intimately incorporating the asperities throughout the matrix to obtain a random orientation of the asperities through the matrix.

The matrix may be bonded to a core of steel or other metal by the process of application Ser. Nos. 307,420 and 408,166 noted above. Broadly, this process comprises incorporating CaO into the matrix prior to curing, and then at high temperatures curing the matrix in pressed contact with the core material. Conveniently, the CaO may be incorporated into the matrix at the same time as are the asperities and other additives noted above.

Generally, the friction material of the invention can be formed by high shear blending together of the solid particles of the fluoroelastomer component having its appropriate accelerators, stabilizers and curing agents previously dispersed therethroughout with solid particles of the polyacrylate component having its appropriate accelerators, stabilizers and curing agents previously dispersed therethroughout to form a homogeneous uniform intimate codispersion of the fluoroelastomer and the polyacrylate components. The carbon black, asperities and CaO components can be either previously blended with each of the fluoroelastomer component and the polyacrylate component or can be added during the step of blending together the fluoroelastomer with the polyacrylate. Usually at least the carbon black will be previously dispersed throughout both of the fluoroelastomer and polyacrylate components since each of these components are commercially available in such a form.

It should be noted that the accelerators, stabilizers and curing agents of the fluoroelastomer are generally different than the accelerators, stabilizers and curing agents of the polyacrylate. Thus it is rather surprising that a composite friction material using a mixture of these two components is sufficiently structurally sound to exhibit good frictional and structural characteristics under heavy frictional usage. Because of the considerably different accelerators, stabilizers and curing agents generally used with the fluoroelastomer and polyacrylate components it is believed that at most a minor amount of cross-linking occurs between the two polymer systems. Yet, the resulting friction material has both good frictional and structural characteristics as previously mentioned. The friction material further exhibits a good thermal operating range although containing significant amounts of the non-halogenated polyacrylate component.

Conventional molding techniques, such as compression transfer or injection molding, are utilized for forming the matrix/backing plate friction element. In applying the friction material to the backing plate of the friction element, it is usually desirable to apply the friction material to the plate in an amount sufficient to obtain a finished thickness of friction material of from about 0.020 to about 0.250 inches, especially in applications where the material is utilized in clutches.

The friction material of this invention exhibits a high, stable, dynamic coefficient of friction through a wide range of sliding speeds and normal loads against a wide variety of opposing faces and finishes. For example, dynamic friction coefficients ($\mu D$) of from about 0.14 to about 0.06 at from about 2,000 to 11,000 ft/min sliding speed and from about 50 to about 680 psi of face pressure on gross area typically can be expected in friction elements comprised of the friction material of this invention.

Additionally, good static ("breakaway") coefficients of friction from about 0.17 to about 0.26 are characteristic of this friction material.

The friction material of this invention is capable of operating against mating surfaces of a variety of types, for example, hard or soft steel, cast iron, sintered metals, and ground, deburred or lapped surfaces. However, the mating surface finish may adversely affect the friction characteristics of the friction material if this surface is too roughly or too finely finished. Generally, a mating surface finish of about 10 to about 45 m$\mu$ will result in satisfactory performance of the friction material.

The friction material of this invention is further characterized by low wear and dimensional stability can be expected during extended dynamic operation. Furthermore, the material exhibits a relatively flat torque curve that "wrings in" about 10 – 50% above the dynamic torque.

The friction material of this invention will respond according to test results over a wide operating surface temperature range. In general, the material can be expected to maintain optimum response levels at bulk temperatures below about 475° F; i.e., where the average surface temperature of the friction material between operations of the friction element is below about 475° F. Maximum peak temperatures, however, may be as high as from about 560° F to about 680° F before performance of the friction material is substantially affected.

In general, effective performance of the friction material contemplates operation of the friction element under oil cooled operating conditions. However, a much wider selection of oils may be effectively employed with the friction material than with, for example, bronze.

In preparing friction elements utilizing the friction material of this invention, it will generally be found that after demolding, few if any of the asperities will be present on the frictional surface of the material. The thin elastomer coating covering the asperities must therefore be worn off to expose the asperities and hence to obtain a stable coefficient of friction for the element. This may either be done in situ, allowing the rubber coating to be worn off during an initial break-in period of the friction element in the service vehicle, or by pregrinding of the friction material before installation of the element. The amount of matrix material which must be removed to obtain a desirably stable coefficient of friction for the material as a whole will of course vary according to the specific formulation. However, it is generally advantageous to sufficiently expose a major portion of the underlying asperities to a point where these asperities are in contact with the grinding or mating surface.

During early use, these asperities are ground to a point where they appear to be well-worn, as shown in FIGS. 1 and 2, to obtain a stable coefficient of friction. The asperities appear to be mechanically bonded i.e. mechanically held but not chemically bonded in the matrix.

The fluoroelastomer-polyacrylate elastomer matrix of the present invention has the distinct advantage of being reboundably deflecting at normal use temperature, as for example when in use as part of a clutch plate. Normal use temperature, as discussed previously include average surface temperatures between operations of generally below about 475° F. Generally, normal use temperature will be at least about 180° F in frictional operation. Thus, the matrix is reboundably deflecting and resilient in the temperature range from about 180° to about 475° F. The term reboundably deflecting as used herein means that the asperities particles which are at the surface of the material are pushed or deflected thereinto during contact with a mating reaction plate as in a clutch but then rebound back as the material resumes its natural or unstressed state when the mating reaction plate is removed from contact therewith. It is clearly of great advantage to have a friction material that is reboundably deflecting at its use temperature yet is not easily or quickly worn away (due to the asperities) since this allows for a controlled and relatively smooth change in friction as pressure is applied between the material and a mating reaction plate plus long wearing characteristics.

The structure and operation of the friction material of the present invention may be still better understood by reference to the figures of the drawing wherein like numbers denote like parts throughout. A friction material 10 in accordance with the present invention is illustrated as including a matrix 12 of previously mentioned composition with asperities 14 suspended mechanically therein in non-bonded relationship thereto. The friction material 10 is bonded to a metal backing plate 16. In operation, the surface of the friction material 10 removed from the backing plate 16 faces a mating plate 18 with a fluid layer 20 generally therebetween. In operation in a clutch, the mating plate 18 and the facing surface of the friction material 10 are forced towards one another while rotating relative to one another. Thus, a high shear is introduced in the fluid layer 20 whereby a substantial amount of the energy of clutch engagement is absorbed. On contact, a top portion 22 of each protruding one of the asperities 14 touches the mating plate 18 and the asperities 14 thus tend to flatten as illustrated in FIG. 2. Also, due to the reboundably deflecting character of the matrix 12 at use temperature the protruding asperities 14 are pushed down against the matrix 12. On release of pressure, as when the mating plate 18 is moved away from the friction material 10, the asperities 14 spring up under the impetus of the resilient matrix 12 and return generally to their original protuberance above said matrix 12. Thus, relatively smooth clutch engagement occurs, first via the fluid 20 shear, then via the asperities 14 during their partial retraction into the matrix 12 and finally via the direct supported contact of the asperities 14 with the mating plate 18.

The following example is provided only to further illustrate specific friction material compositions of this invention and pertinent frictional characteristics thereof, without limiting the invention in any manner:

Example

| Ingredients | Amount (Parts by Weight) | |
|---|---|---|
| | Formula 1 | Formula II |
| Viton E60 | 50 Parts | 70 Parts |
| Polyacrylate | 50 Parts | 30 Parts |
| Fiberfrax | 30 Parts | 110 Parts |
| Carbon Black | 50 Parts | 57 Parts |
| Accelerators Stabilizers Curing Agents | Minor amounts | Minor amounts |
| CaO | 5 Parts | 5 Parts |

The clutch plate having Formula I affixed thereto exhibited dynamic coefficients of friction of 0.114 at 7000 fpm (feet per minute) and 50 psi, 0.086 at 5000 fpm and 250 psi and 0.071 at 7000 fpm and 250 psi. The failure point of this clutch plate was above 11,000 fpm. The wear of the friction material on this plate at 7000 fpm and 250 psi was 1 mil. Wear was measured by a screening test comprising 120 to 200 cycles of break in at 5000 fpm and 100 psi. (until the dynamic coefficient of friction stabilized) followed by a cycle of 15 clutch engagements each at 50 psi, 150 psi and 250 psi at 3000 fpm, then a cycle of 15 clutch engagements each at 50 psi, 150 psi and 250 psi at 5000 fpm, and then a cycle of 15 clutch engagements each at 50 psi, 100 psi, 150 psi, 200 psi and 250 psi at 7000 fpm. The clutch was periodically checked at 5000 fpm and 100 psi to assure that no significant change in dynamic coefficient of friction had occured. Wear values obtained were generally good to about ± 0.3 mil.

The clutch plate having Formula II affixed thereto exhibited dynamic coefficients of friction of 0.089 at 7000 fpm and 50 psi, 0.088 at 5000 fpm and 250 psi and 0.081 at 7000 fpm and 250 psi. The failure point of this clutch plate was not measured. The rate of wear of the friction material on this plate at 7000 fpm and 250 psi was 0 mil.

In each case the Formulas were compounded by mixing in a Banbury mixer to achieve an even dispersion of the additives into the matrix and of the two components (the fluoroelastomer and the polyacrylate) of the matrix into one another with random orientation of the asperities (Fiberfrax) particles.

Each Formula mixture was applied to a steel backing plate and pressed to this plate into the desired pattern under about 2,500 psi. Formula I then was cured for 30 minutes at 335° - 340° F and Formula II for 10 minutes in the same temperature range. Sufficient mixture material was applied to each plate to give a thickness of material, when cured, of 0.050 inches/face. The cured elastomer and backing plate, i.e., clutch disc, were then postcured at 450° F for 3 hours.

The friction material possessed a Shore A Hardness of 90 - 95, and an ultimate tensile strength of 1,900 to 2,100 psi. The friction material was found to have an excellent thermal stability.

While the invention has been described in connection with specific embodiments thereof, it will be understood that it is capable of further modifications, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. As an article of manufacture a friction material formed of 20 to 60% by weight of a matrix comprising a fluoroelastomer intimately intermixed with a polyacrylate elastomer in a weight ratio of fluoroelastomer to polyacrylate which falls within the range from about 11:1 to about 1:11, at least 5% by weight of said 20 to 60% by weight total matrix being said fluoroelastomer, from about 12 to about 40% by weight of carbon black; and from about 20 to about 60% by weight of glassy or ceramic asperite particles of from about 0.0001 to about 0.005 inch in effective diameter intermixed with and dispersed throughout said friction material in mechanically held nonbonded relation to provide a friction surface of said article of manufacture including the said matrix and said ceramic particles.

2. A friction material as in claim 1, wherein said fluoroelastomer comprises a copolymer of hexafluoropropylene and vinylidene fluoride and said polyacrylate elastomer has a repeating structural formula — $CH_2$ — CH (COOR) — where R is hydrogen or a low molecular weight alkyl group having one to six carbon atoms.

3. A friction material as in claim 2, wherein the weight ratio of fluoroelastomer to polyacrylate falls within the range from about 5:1 to about 1:5.

4. A friction material composition comprising 20 to 60% by weight of a matrix consisting essentially of a copolymer of hexafluoropropylene and vinylidene fluoride intimately intermixed with a polyacrylate elastomer in a weight ratio of fluoroelastomer to polyacrylate which falls within the range from about 11:1 to about 1:11, at least 5% by weight of said 20 to 60% by weight total matrix being said fluoroelastomer, from about 12 to about 40 % by weight of carbon black; and from about 20 to about 60% by weight of glassy or ceramic asperite particles having a minimum size of 0.0001 inch which are dispersed throughout the matrix in mechanically held nonbonded relation and assuring a relatively high surface concentration of the asperite particles to provide a friction surface of said friction material including said matrix and said particles.

5. A friction material composition as in claim 4 wherein said asperite particles are glass fibers of a size from about 0.0001 to about 0.005 inch in diameter and having a length to diameter ratio of from about 3 to 10,000.

* * * * *